(12) United States Patent (10) Patent No.: US 12,694,369 B2
Bunch (45) Date of Patent: Jul. 28, 2026

(54) PACKAGE SORTATION SYSTEM

(71) Applicant: Adam Bunch, Mission Viejo, CA (US)

(72) Inventor: Adam Bunch, Mission Viejo, CA (US)

( * ) Notice: Subject to any disclaimer, the term of this patent is extended or adjusted under 35 U.S.C. 154(b) by 39 days.

(21) Appl. No.: 18/583,789

(22) Filed: Feb. 21, 2024

(65) Prior Publication Data

US 2024/0420077 A1 Dec. 19, 2024

Related U.S. Application Data

(60) Provisional application No. 63/521,676, filed on Jun. 18, 2023.

(51) Int. Cl.
G06Q 10/087 (2023.01)
G06K 15/02 (2006.01)
G06Q 10/083 (2024.01)

(52) U.S. Cl.
CPC ......... G06Q 10/087 (2013.01); G06K 15/024 (2013.01); G06K 15/028 (2013.01); G06Q 10/083 (2013.01)

(58) Field of Classification Search
CPC .. G06Q 10/087; G06Q 10/083; G06K 15/024; G06K 15/028
See application file for complete search history.

(56) References Cited

U.S. PATENT DOCUMENTS

| | | | | |
|---|---|---|---|---|
| 9,792,580 B1 * | 10/2017 | Yan | ..................... | G06K 7/10881 |
| 10,915,804 B1 * | 2/2021 | Shmulevich | ......... | G06Q 10/083 |
| 11,488,106 B1 * | 11/2022 | Shoup | ................ | G06K 19/0614 |
| 12,367,449 B2 * | 7/2025 | Coleman | .......... | G06K 19/06028 |
| 2024/0417175 A1 * | 12/2024 | Hinojosa | .............. | B65G 1/1378 |

* cited by examiner

*Primary Examiner* — Garcia Ade

(74) *Attorney, Agent, or Firm* — J.H. Lin Patent Law P.C.; John H. Lin

(57) ABSTRACT

A package sortation system is provided. The system receives an inventory of multiple shipping resources. The system receives a blank sortation label having three or more pre-defined regions, each predefined region associated with a unique color and is laced with a coloring agent of the region's unique color. The coloring agent remain invisible until activated to become visible with the region's unique color. The system extracts first and second data from a sortation instruction. The first data and the second data jointly identify one of the multiple shipping resources. The system selects one region of the three or more predefined region based on the first data, and a symbol (or pattern) based on the second data. The system prints the selected symbol on the selected region of the sortation label by activating the coloring agent of the selected region.

13 Claims, 6 Drawing Sheets

PACKAGE SORTATION SYSTEM

CROSS REFERENCE TO RELATED PATENT APPLICATION

The present disclosure is part of a non-provisional application that claims the priority benefit of U.S. Provisional Patent Application No. 63/521,676, filed on Jun. 18, 2023. Content of the above-listed application is herein incorporated by reference.

BACKGROUND

Technical Field

The present disclosure generally relates to sorting of packages for shipping.

Description of the Related Arts

Shipping companies process an enormous volume of packages each hour, each day. To sort the packages for shipping, sortation labels attached to the packages are used to indicate how and where to sort. Though most of the sortation tasks are performed by machines, human workers are still needed to complete the delivery of the packages. However, the labels are mostly designed for machine processing, not human eye recognition. This results in inevitable human mistakes, causing some packages to be loaded into the wrong vehicles and delivered to the wrong destinations, incurring delays and costs. Given the sheer volume of packages being processed daily, even rare mistakes can cause enough packages to be sorted incorrectly to cause substantial problems for the shipping companies.

SUMMARY

Some embodiments of the invention provide a package sortation system. The system receives package information for a package. The system receives an inventory of a plurality of shipping resources that may correspond to delivery vehicles or docking locations for the delivery vehicles. The system receives a blank sortation label having three or more predefined regions, wherein each predefined region is associated with a unique color and is laced with a coloring agent of the region's unique color, wherein the coloring agent remains invisible until activated to become visible with the region's unique color. In some embodiments, the coloring agent is heat activated and the printing is thermal printing. In some embodiments, the color agent is built into the blank label and remain invisible until activated by heat or abrasion or pressure. The coloring agent may be transparent before being activated, or has a default color before being activated.

The system generates a sortation instruction based on a status of the shipping resources in the inventory and the package information. The package information of the package may be received by optically scanning a source label attached to the package. The inventory of shipping resources may be a dynamic inventory that is continuously updated to reflect real-time status. The inventory may also be a static inventory that is not updated in real-time.

The sortation instruction assigns the particular package to the identified shipping resource. The system extracts first and second data from the sortation instruction. The first data and the second data jointly identify one shipping resource of the plurality of shipping resources. The first data may identify a particular shipping resource (e.g., a truck or truck space), while the second data may correspond to a group of shipping resources (e.g., a "drop"). The system selects one region of the three or more predefined region based on the first data, and selects a symbol (or pattern) based on the second data. The system prints the selected symbol (or pattern) on the selected region of the sortation label by activating the coloring agent of the selected region.

In some embodiments, only the selected region among the three or more predefined regions is printed. In some embodiments, the system may also print first and second data on a region of the sortation label that is outside of the three or more predefined regions. The system may also extract a third data from the sortation instruction and prints a pattern based on the third data (or the third data itself) on a region of the sortation label that is outside of the three or more predefined regions. The third data may indicate a destination address of the package, for example.

The preceding Summary is intended to serve as a brief introduction to some embodiments of the disclosure. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a Summary, Detailed Description and the Drawings are provided. Moreover, the claimed subject matter is not to be limited by the illustrative details in the Summary, Detailed Description, and the Drawings, but rather is to be defined by the appended claims, because the claimed subject matter can be embodied in other specific forms without departing from the spirit of the subject matter.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

It is possible to minimize the sorting mistakes problem by investing in newer technologies by say, inserting microchips into the sortation labels or employing advanced artificial intelligence or robotic systems. Given the enormous flow of packages involved, any complex technological solution is bound to be either expensive or unreliable, at least initially. Not to mention the need to upgrade a great number of equipment used by workers in the field.

Some embodiments of the invention provide a novel package sortation system that can significantly reduce occurrences of human mistakes due to sortation labels. The system can be inexpensively deployed, with minimal modification to the existing shipping infrastructure and equipment.

In some embodiments, the system uses an apparatus for generating sortation labels. The apparatus receives a blank sortation label having three or more predefined regions. Each region is associated with a unique color and is laced with a coloring agent of the region's unique color. The coloring agent remain invisible until activated to become visible with the region's unique color. The apparatus extracts first and second data from a sortation instruction. The first data and the second data may jointly identify one of multiple shipping resources. The apparatus selects one region of the three or more predefined regions of the blank sortation label based on the first data. The apparatus selects a symbol (or pattern) based on the second data. The apparatus then prints the selected symbol on the selected region of the sortation label by activating the coloring agent of the selected region.

Figure 1:
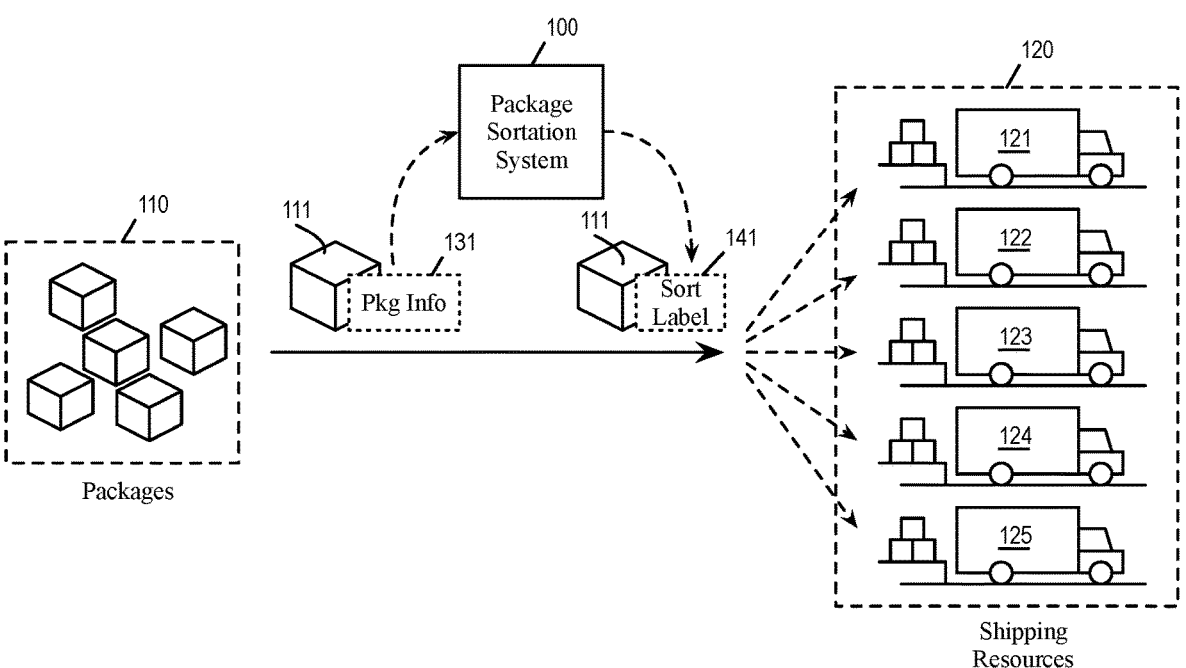
FIG. 1 conceptually illustrates a package sortation system according to some embodiments of the invention.
Figure 1:
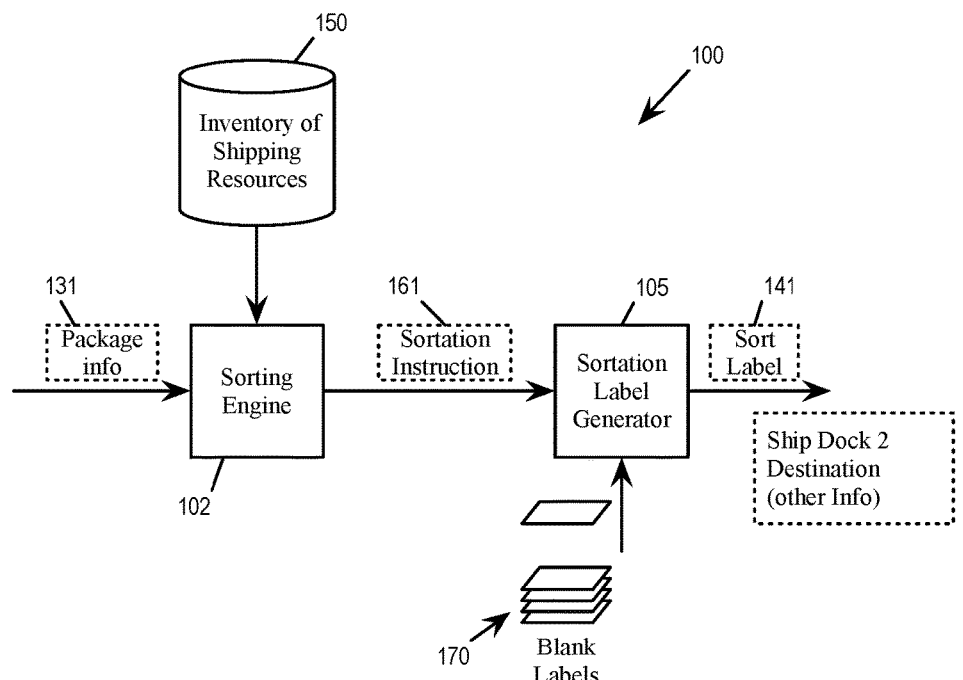

FIG. 1 conceptually illustrates a package sortation system according to some embodiments of the invention. As illustrated, a package sortation system 100 is deployed to assign packages 110 to be shipped by shipping resources 120, which include trucks 121-125 or other types of delivery vehicles parked in different shipping docks. The package sortation system 100 prints out a sortation label for each package. The sortation label identifies the shipping resource that is assigned to ship the package. Workers and/or sorting machines may use the sortation labels to determine where to move the packages.

In the example, package sortation system 100 receives a package 111. The package information 131 of the package 111 is received by the package sortation system 100 (by e.g., optically scanning a source label attached to the package.) Based on the package information 131 and a shipping resource inventory 150, a sortation engine 102 selects a shipping resource to assign to the package 111.

The shipping resource inventory 150 is a list of shipping resources that are ready to receive the packages for shipping. In the example, the inventory 150 indicates the trucks 121-125 are available for receiving the packages. The inventory 150 may also indicates the capacity, the limitations, the current remaining capacity, and other status or information of each shipping resource. In some embodiments, the inventory 150 is a dynamic inventory that is continuously updated in real-time. In some embodiments, the inventory 150 provide static information only. The sortation engine 120 may examine the inventory 150 to identify the most suitable shipping resource based on the package information 131 for dispatching the package 111.

The sortation engine 102 instructs (by issuing an instruction 161) a sortation label generator 105 to print a sortation label 141 for the package 111. In the example, the sortation label 141 identifies the shipping truck 122 as the shipping resource assigned to ship the package 111. The sortation label 141 is attached to the package 111 such that a human worker or a sorting machine upon seeing the sortation label 141 would know to move the package 111 into the shipping truck 122.

The sortation label generator 105 prints the sortation label 141 on one of the blank labels 170. The sortation label generator 105 may incorporate a printer or control a printer for printing the sortation labels. In some embodiments, thermal printing is used, and the blank labels are thermal printing papers. In some embodiments, the sortation label generator 105 includes a thermal printer. In some embodiments, the sortation label generator 105 controls a thermal printer. In some embodiments, several (e.g., three or more) predefined regions of the blank sortation labels 170 are laced with coloring agents that remain invisible until activated by the heat applied by the thermal printer. In some embodiments, the sortation label generator 105 activate the coloring agents by applying abrasion or pressure at specific predefined regions. Each region is associated with a unique color and is laced with the coloring agent of the region's unique color.

Figure 2:
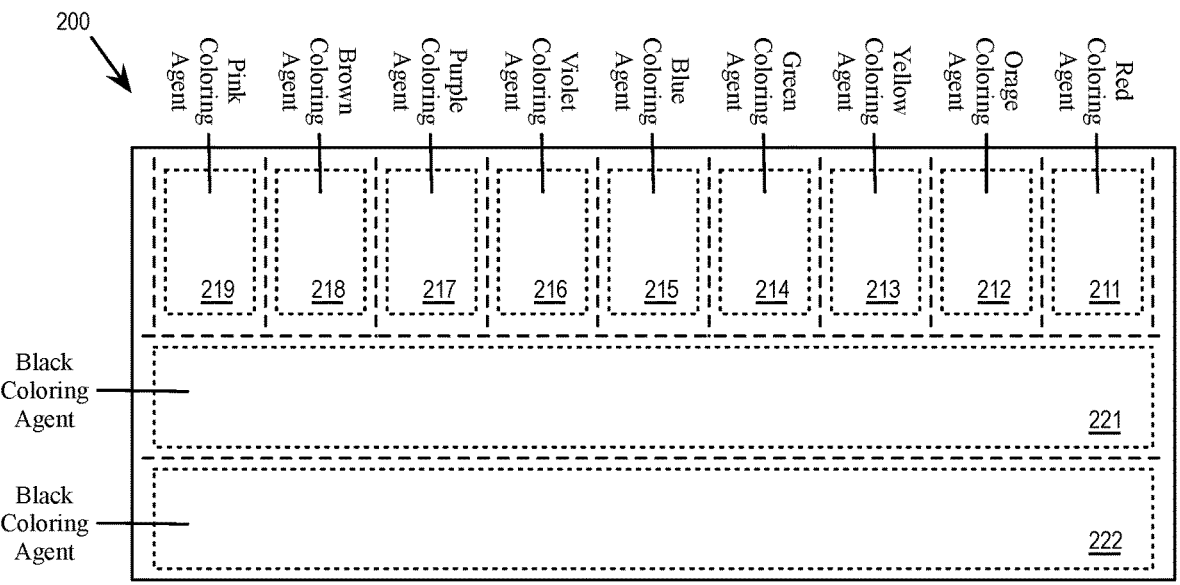
FIG. 2 illustrates an example blank sortation label that is used by the package sortation system.

FIG. 2 illustrates an example blank sortation label 200 that is used by the package sortation system. As illustrated, the example blank sortation label 200 has nine predefined regions 211-219. The nine predefined regions are laced with invisible coloring agents of nine unique colors (red, orange, yellow, blue, violet, purple, brown, pink in the example.) In some embodiments, the predefined regions are laced with colors with non-zero chrominance values (i.e., not black, white, or other shades of gray). The coloring agent lacing each predefined region is heat activated, such that before the heat activation, each predefined region is in its default appearance. (The default appearance may be white or the color of the paper; the coloring agent may be transparent before heat activation.) After heat activation by the thermal printer, the predefined region may reveal pattern(s) or symbol(s) in the target color of the coloring agent.

The blank sortation label 200 also has regions 221 and 222 that are outside of the of the predefined regions. The other regions 221 and 222 may be laced with heat activated black coloring agents, or not laced with any coloring agent at all and can be imprinted by regular (ink based) printer.

Figure 3:
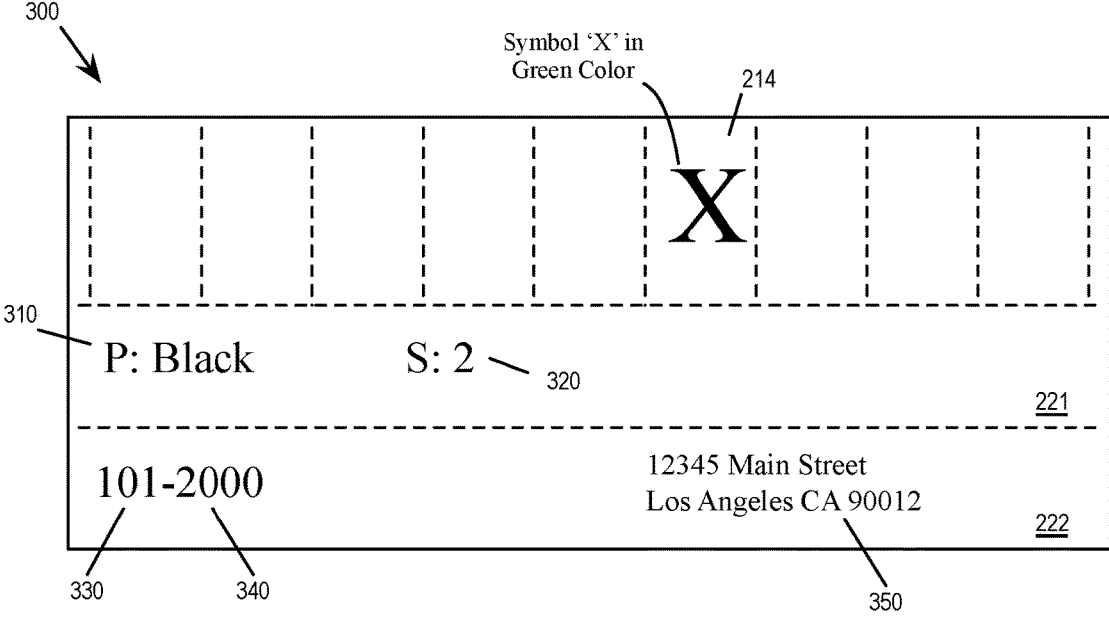
FIG. 3 illustrates a sortation label that is populated with information by the package sortation system.

FIG. 3 illustrates a sortation label 300 that is populated with information by the package sortation system. The information may be extracted from the sorting instruction (e.g., the sorting instruction 161 provided by the sorting engine 120.) The sortation label generator 105 performs thermal printing on the blank sortation label 200 to generate the populated sortation label 300. As illustrated, the sortation label generator 105 has performed thermal printing on the predefined region 214 to print a symbol 'X'. Since the predefined region 214 of the blank sortation label 200 is laced with heat activated green coloring agent, the symbol 'X' is in green color.

The sortation label generator 105 may also populate other regions of the sortation label 300 with other information. In the example, the regions 221 and 222 are populated with a penn identifier 310 (a "penn" identifies a line of trucks ready for loading), a drop number 320 (a "drop" identifies a group of trucks in a "penn"), a truck space number 330 (identifies the shipping dock of the truck), a load sequence number 340 (identifies where to place the package in a truck), and other information 350 (such as destination address of the package.) The information 310-350 may be printed in black and white (i.e., not colored or having zero chrominance value).

Figure 4A:
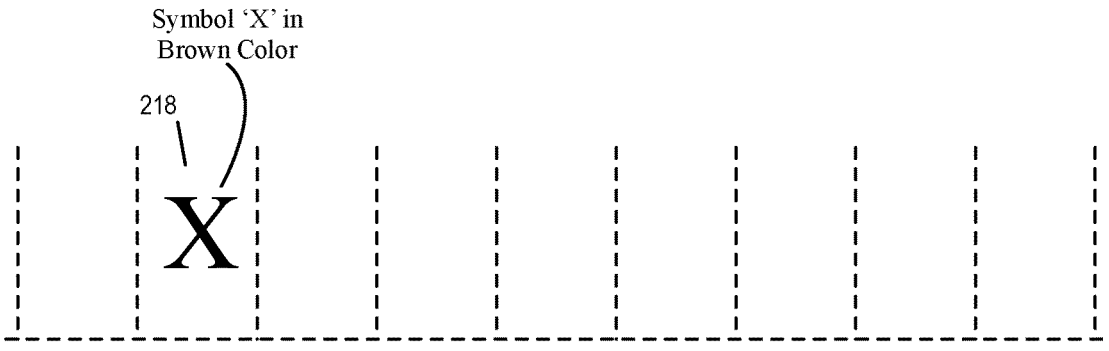
FIGS. 4A-D illustrates using thermal printing into different predefine regions of the sortation label to create symbols or patterns of different colors.
Figure 4B:
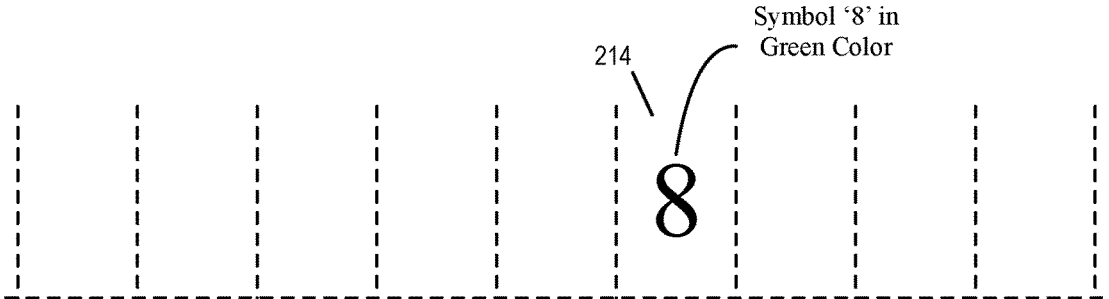
Figure 4C:
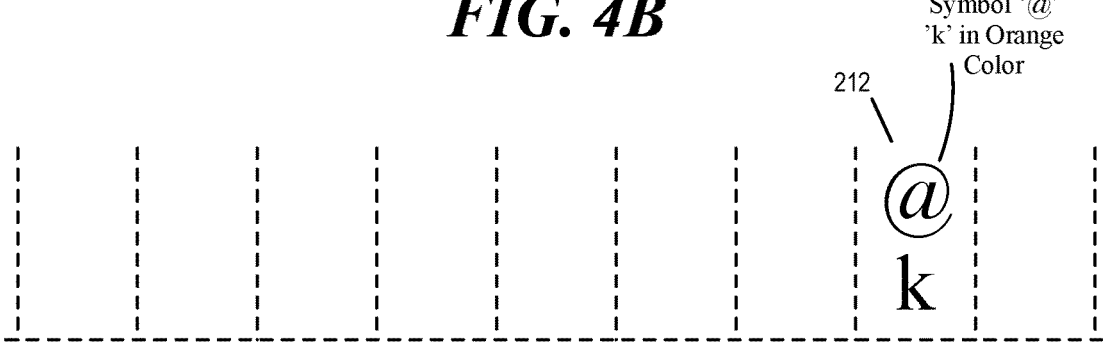
Figure 4D:
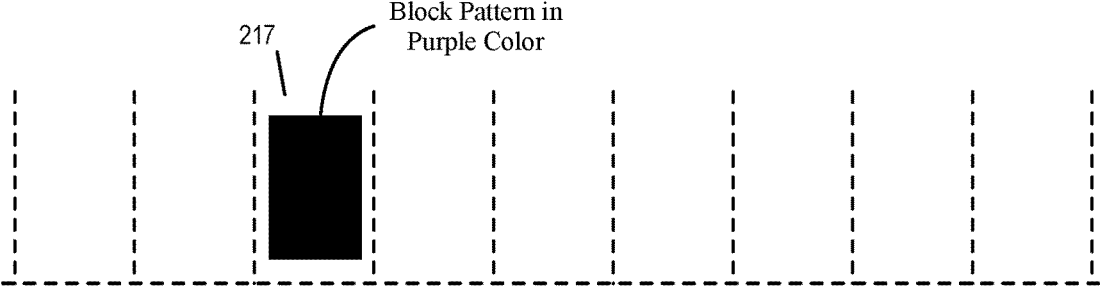

FIGS. 4A-D illustrates using thermal printing into different predefine regions of the sortation label to create symbols or patterns of different colors. FIG. 4A illustrates an example in which the sortation label generator 105 has performed thermal printing on the predefined region 218 to print a symbol 'X'. Since the predefined region 218 of the blank sortation label 200 is laced with heat activated brown coloring agent, the symbol 'X' is in brown color. FIG. 4B illustrates an example in which the sortation label generator 105 has performed thermal printing on the predefined region 214 to print a symbol '8'. Since the predefined region 214 is laced with heat activated green coloring agent, the symbol '8 is in green color. FIG. 4C illustrates an example in which the sortation label generator 105 has performed thermal printing on the predefined region 212 to print multiple symbols '@' and 'k'. Since the predefined region 212 is laced with heat activated orange coloring agent, the symbols '@' and 'k' are in orange color. FIG. 4D illustrates an example in which the sortation label generator 105 has performed thermal printing on the predefined region 217 to print a block pattern. Since the predefined region 217 is laced with heat activated purple coloring agent, the block pattern is in purple color.

As shown in FIGS. 3-4, the sortation label generator 105 can print symbols in different colors by simple thermal printing in different predefined regions of the sortation labels. Colored sortation labels are easy for human workers to distinguish and recognize, thereby providing an inexpensive and faster mean of ensuring accurate sorting and reducing costly sorting mistakes. Furthermore, since thermal printers are already in wide use by some shipping companies for generating labels, the package sortation system 100 can be quickly and cheaply deployed with simple software or firmware update.

In some embodiments, the sortation label generator 105 selects only one region of the predefined regions 211-219 for thermal printing, thereby ensuring at most only one color that is not black/white/gray appears in sortation label. In some other embodiments, the sortation label generator 105 may select two or more of the predefined regions for thermal printing, thereby allowing printing multiple symbols or patterns in two or more different colors that are not black/ white/gray.

In some embodiments, the package sortation system 100 uses colored symbols or patterns in the predefined regions to indicate or encode information, such as identifiers for shipping resources. For example, in some embodiments, a symbol may identify a "drop" while the color of the symbol may identify a specific truck (or a shipping dock/truck space) in the "drop". In some embodiments, identifiers of the drop and of the truck space are also expressly printed on the sorting label (e.g., the drop number 320 and the truck space number 330, which can be printed in black and white and outside the predefined regions with coloring agents.)

Figure 5:
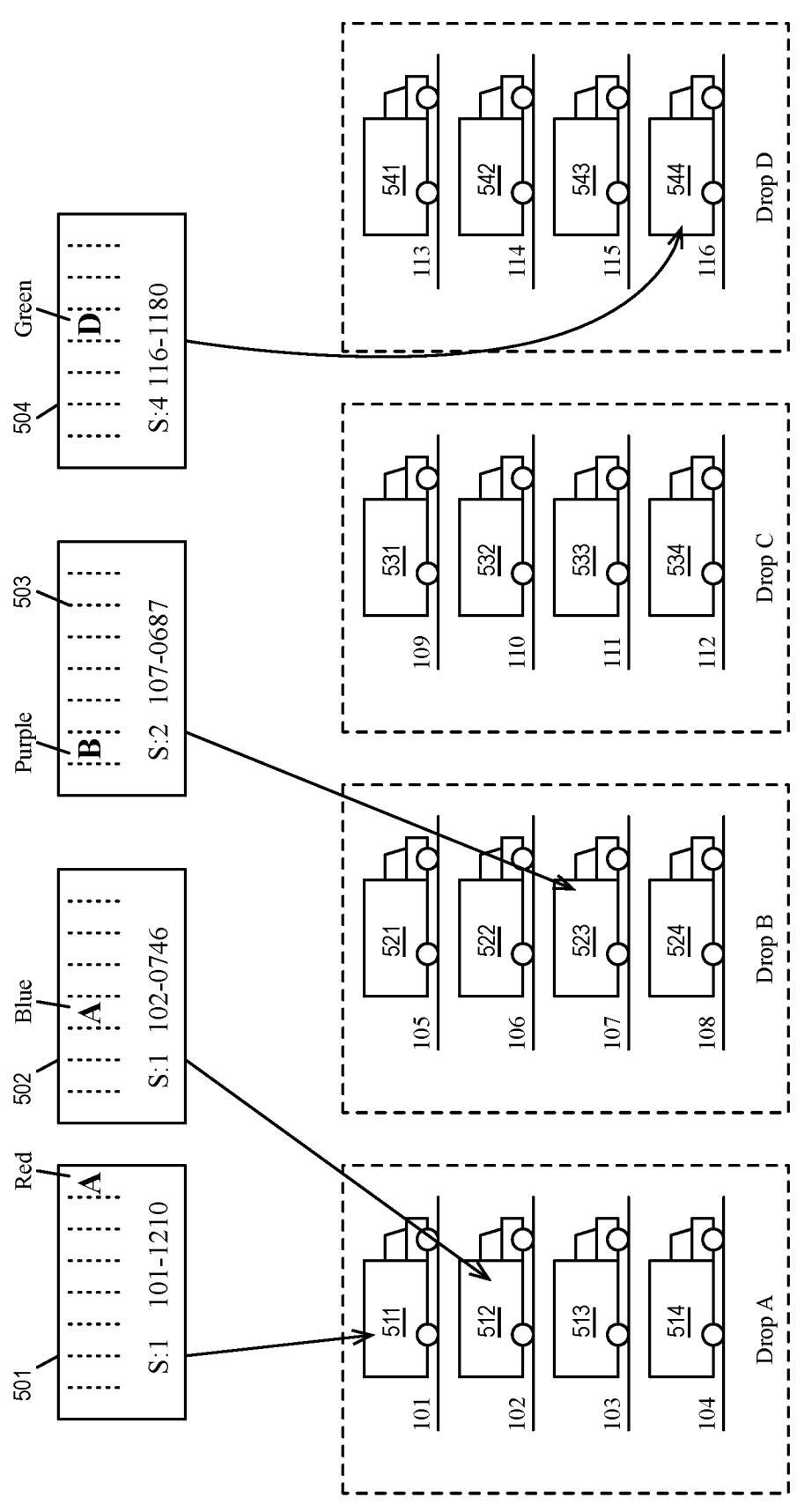
FIG. 5 illustrates using colored symbols to identify shipping resources.

FIG. 5 illustrates using colored symbols to identify shipping resources. The figure illustrates several example sorting labels that are coded with color symbols to identify trucks in different "drops". The symbols are printed into different predefined regions of the labels to be in different colors. The figure illustrates 4 different drops of trucks labeled 'A', 'B', 'C', and 'D'. Each "drop" has several trucks. A sorting label 501 showing a red 'A' indicates the package is sorted to a truck 511 at truck space 101 in drop 'A'. A sorting label 502 showing a blue 'A' indicates the package is sorted to a truck 512 at truck space 102 in drop 'A'. A sorting label 503 showing a purple 'B' indicates the package is sorted to a truck 523 at truck space 107 in drop 'B'. A sorting label 504 showing a green 'D' indicates the package is sorted to a truck 544 at truck space 116 in drop 'D'. Each sorting label also expressly indicates the drop number, truck space number, and sequence number, albeit in black and white.

Figure 6:
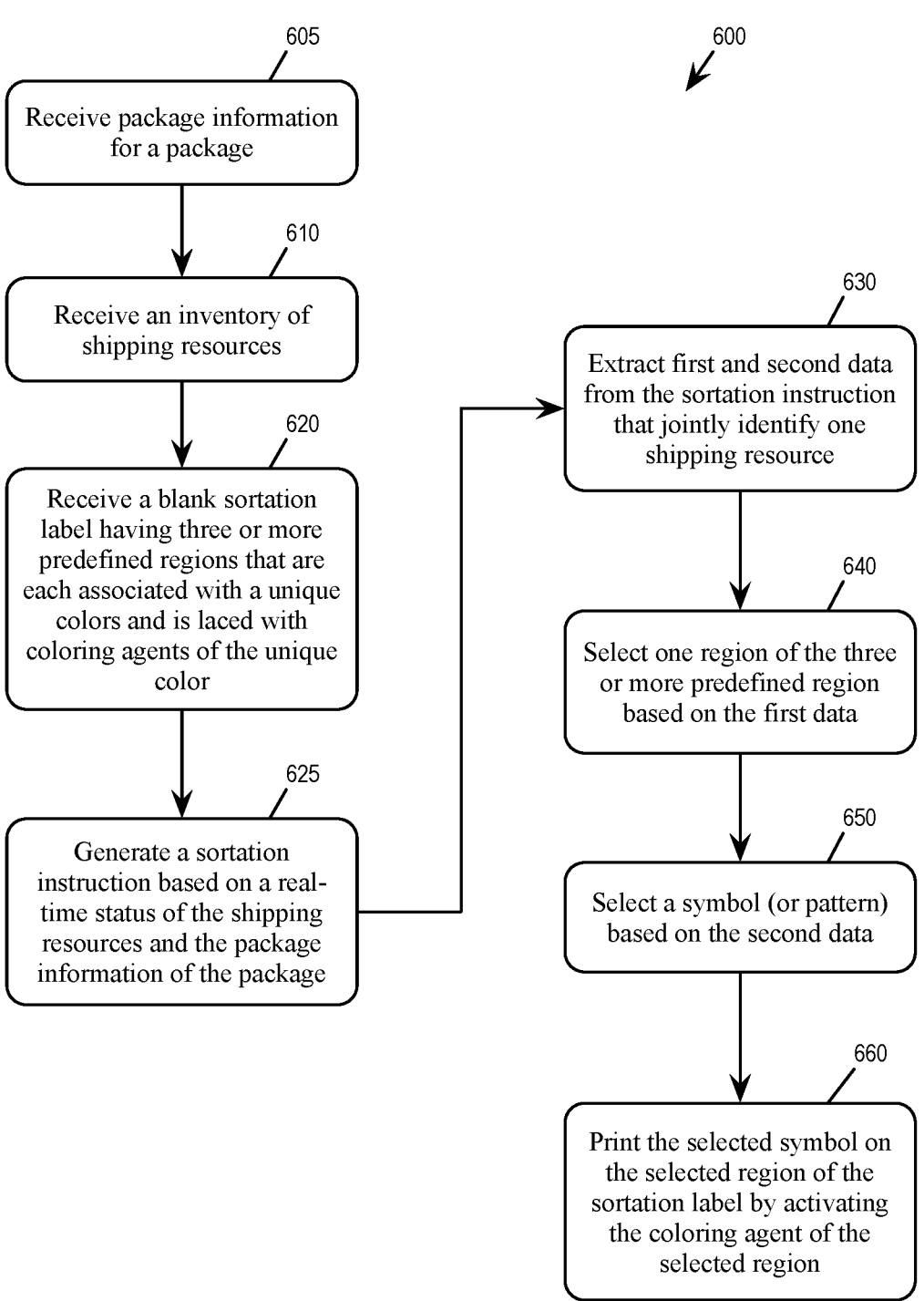
FIG. 6 conceptually illustrates a process for generating sorting labels by a package sorting system.

FIG. 6 conceptually illustrates a process 600 for generating sorting labels by a package sorting system for some embodiments. In some embodiments, one or more processing units (e.g., processor) of a computing device implementing the package sorting system 100 perform the process 600 by executing instructions stored in a computer readable medium.

The system receives (at 605) package information for a package. The package information of the package may be received by optically scanning a source label attached to the package.

The system receives (at 610) an inventory of a plurality of shipping resources that may correspond to delivery vehicles (e.g., trucks) or docking locations (e.g., truck spaces or routing identifier) for the delivery vehicles. The inventory of shipping resources may be a dynamic inventory that is continuously updated to reflect real-time status. The inventory may also be a static inventory that is not updated in real-time.

The system receives (at 620) a blank sortation label comprising three or more predefined regions, wherein each predefined region is associated with a unique color and is laced with a coloring agent of the region's unique color, wherein the coloring agent remain invisible (or has a default color/appearance) until activated to become visible with the region's unique color. In some embodiments, the coloring agent is heat activated and the printing is thermal printing. The coloring agent may be transparent before being activated, or has a default color before being activated.

The system generates (at 625) a sortation instruction (e.g., the sortation instruction 161) based on a status of the shipping resources in the inventory and the package information. The sortation instruction assigns the particular package to the identified shipping resource.

The system extracts (at 630) first and second data from the sortation instruction, wherein the first data and the second data jointly identify one shipping resource of the plurality of shipping resources. The first data may identify a particular shipping resource (e.g., a truck or truck space), while the second data may correspond to a group of shipping resources (e.g., a "drop"). The system selects (at 640) one region of the three or more predefined region based on the first data. The system selects (at 650) a symbol (or pattern) based on the second data.

The system prints (at 660) the selected symbol on the selected region of the sortation label by activating the coloring agent of the selected region (e.g., by controlling a thermal printer.) In some embodiments, only the selected region among the three or more predefined regions is printed. In some embodiments, the system may also print first and second data on a region of the sortation label that is outside of the three or more predefined regions (in black and white.) The system may also extract a third data from the sortation instruction and prints a pattern based on the third data (or the third data itself) on a region of the sortation label that is outside of the three or more predefined regions. The third data may indicate a destination address of the package, for example.

The flowchart in FIG. 6 illustrates the operation of possible implementations of systems, methods, or computer program products according to various embodiments of the present disclosure. In this regard, each block in the flowchart may represent a module, segment, or portion of instructions for implementing the specified operation(s). In some alternative implementations, the operations noted in the blocks may occur out of the order noted in the FIG. 6. For example, two blocks shown in succession may, in fact, be executed substantially concurrently, or the blocks may sometimes be executed in the reverse order, depending upon the operations involved.

Many of the above-described features and applications, such as the sortation engine 102, the sortation label generator 105, or the package sortation system 100 as a whole, are implemented as software processes that are specified as a set of instructions recorded on a computer readable storage medium (also referred to as computer readable medium). When these instructions arc executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random-access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the present disclosure. In some embodiments, the software programs, when installed to operate on one or more electronic systems, define one or more specific machine implementations that execute and perform the operations of the software programs.

Figure 7:
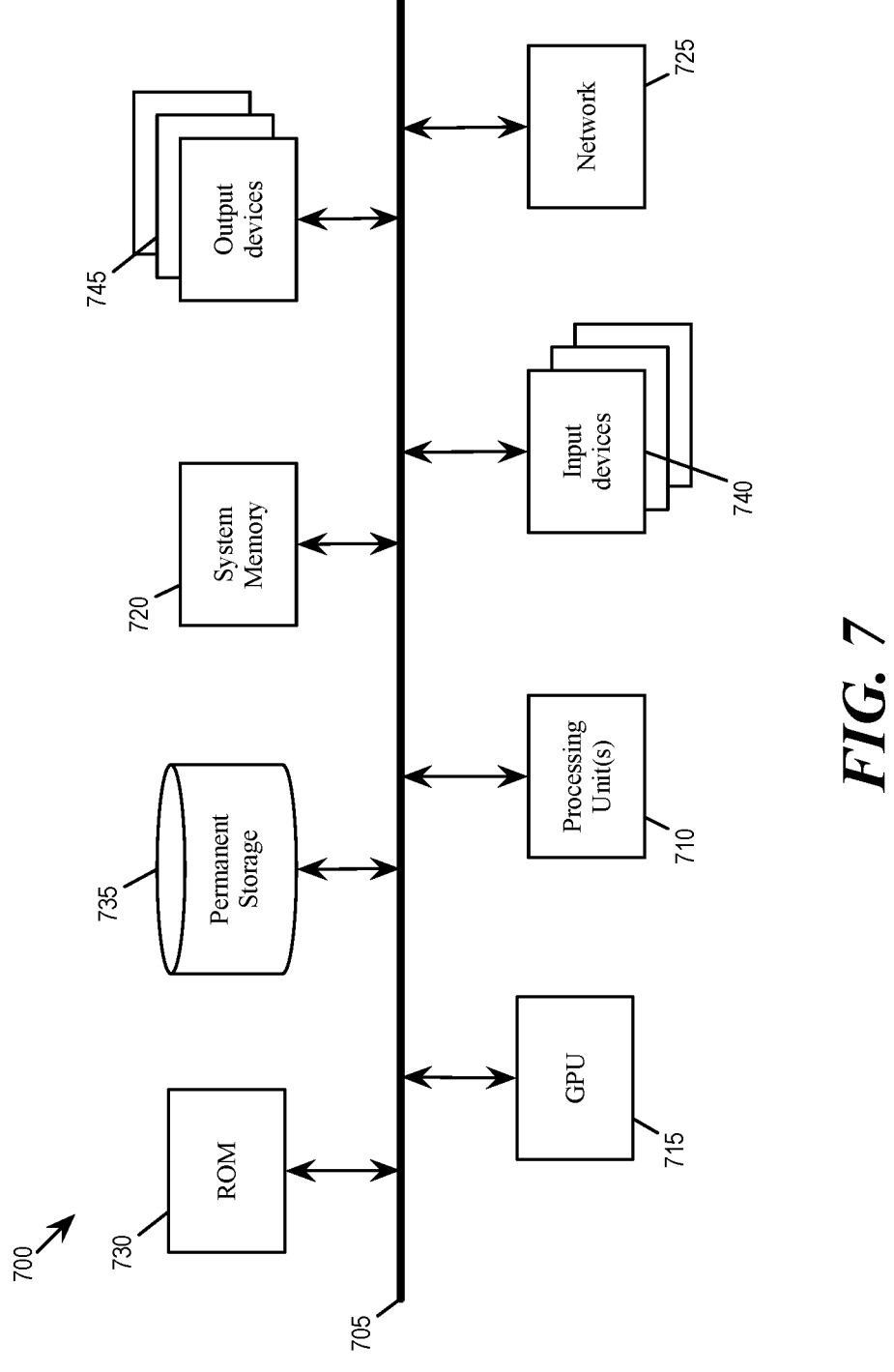
FIG. 7 conceptually illustrates an electronic system with which some embodiments of the present disclosure are implemented.

FIG. 7 conceptually illustrates an electronic system 700 with which some embodiments of the present disclosure are implemented. The electronic system 700 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 700 includes a bus 705, processing unit(s) 710, a graphics-processing unit (GPU) 715, a system memory 720, a network 725, a read-only memory 730, a permanent storage device 735, input devices 740, and output devices 745.

The bus 705 collectively represents all system, peripheral, and chipset buses that communicatively connect the numerous internal devices of the electronic system 700. For instance, the bus 705 communicatively connects the processing unit(s) 710 with the GPU 715, the read-only memory 730, the system memory 720, and the permanent storage device 735.

From these various memory units, the processing unit(s) 710 retrieves instructions to execute and data to process in order to execute the processes of the present disclosure. The processing unit(s) may be a single processor or a multi-core processor in different embodiments. Some instructions are passed to and executed by the GPU 715. The GPU 715 can offload various computations or complement the image processing provided by the processing unit(s) 710.

The read-only-memory (ROM) 730 stores static data and instructions that are used by the processing unit(s) 710 and other modules of the electronic system. The permanent storage device 735, on the other hand, is a read-and-write memory device. This device is a non-volatile memory unit that stores instructions and data even when the electronic system 700 is off. Some embodiments of the present disclosure use a mass-storage device (such as a magnetic or optical disk and its corresponding disk drive) as the permanent storage device 735.

Other embodiments use a removable storage device (such as a floppy disk, flash memory device, etc., and its corresponding disk drive) as the permanent storage device. Like the permanent storage device 735, the system memory 720 is a read-and-write memory device. However, unlike storage device 735, the system memory 720 is a volatile read-and-write memory, such a random access memory. The system memory 720 stores some of the instructions and data that the processor uses at runtime. In some embodiments, processes in accordance with the present disclosure are stored in the system memory 720, the permanent storage device 735, and/or the read-only memory 730. For example, the various memory units include instructions for processing multimedia clips in accordance with some embodiments. From these various memory units, the processing unit(s) 710 retrieves instructions to execute and data to process in order to execute the processes of some embodiments.

The bus 705 also connects to the input and output devices 740 and 745. The input devices 740 enable the user to communicate information and select commands to the electronic system. The input devices 740 include alphanumeric keyboards and pointing devices (also called "cursor control devices"), cameras (e.g., webcams), microphones or similar devices for receiving voice commands, etc. The output devices 745 display images generated by the electronic system or otherwise output data. The output devices 745 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 7, bus 705 also couples electronic system 700 to a network 725 through a network adapter (not shown). In this manner, the computer can be a part of a network of computers (such as a local area network ("LAN"), a wide area network ("WAN"), or an Intranet, or a network of networks, such as the Internet. Any or all components of electronic system 700 may be used in conjunction with the present disclosure.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that is executed by a computer, an electronic component, or a microprocessor using an interpreter.

While the above discussion primarily refers to microprocessor or multi-core processors that execute software, many of the above-described features and applications are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the present disclosure has been described with reference to numerous specific details, one of ordinary skill in the art will recognize that the present disclosure can be embodied in other specific forms without departing from the spirit of the present disclosure. In addition, a number of the figures (including FIG. 6) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the present disclosure is not to be limited by the foregoing illustrative details, but rather is to be defined by the appended claims.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method comprising:

receiving an inventory of a plurality of shipping resources;

receiving a blank sortation label comprising three or more predefined regions, wherein each predefined region is associated with a unique color and is laced with only a coloring agent of the region's unique color and no other coloring agent, such that the three or more predefined regions are respectively laced with coloring agents of at least three different colors in addition to a background color, wherein the coloring agent of each predefined region remains invisible until activated to become visible with the region's unique color;

extracting first and second data from a sortation instruction, wherein the first data and the second data jointly identify one shipping resource of the plurality of shipping resources;

selecting one region of the three or more predefined region based on the first data;

selecting a symbol or pattern based on the second data; and printing the selected symbol or pattern on the selected region of the sortation label by activating the coloring agent of the selected region.

2. The method of claim 1, wherein the coloring agent is heat activated and the printing is thermal printing, wherein the coloring agent is transparent or has a default color before being activated.

3. The method of claim 1, wherein the selected region is the only printed region in the three or more predefined regions.

4. The method of claim 1, wherein the sortation label is to be applied to a particular package, the method further comprising receiving package information for the particular package.

5. The method of claim 4, further comprising generating the sortation instruction based on a real-time status of the plurality of shipping resources and the package information, wherein the sortation instruction assigns the particular package to the identified shipping resource.

6. The method of claim 4, wherein the package information of the particular package is received by optically scanning a source label attached to the package.

7. The method of claim 1, wherein the plurality of shipping resources correspond to one or more identifiers for delivery vehicles.

8. The method of claim 1, further comprising:

printing first and second data on a region of the sortation label that is outside of the three or more predefined regions in black and white.

9. The method of claim 1, further comprising:

extracting a third data from the sortation instruction;

printing a pattern based on the third data on a region of the sortation label that is outside of the three or more predefined regions.

10. The method of claim 9, wherein the third data indicates a destination address of the package.

11. The method of claim 1, wherein the inventory of shipping resources is a dynamic inventory that is continuously updated in real-time.

12. A computing device comprising:

a processor; and a storage device storing a set of instructions, wherein an execution of the set of instructions by the processor configures the computing device to perform acts comprising:

receiving an inventory of a plurality of shipping resources;

receiving a blank sortation label comprising three or more predefined regions, wherein each predefined region is associated with a unique color and is laced with a coloring agent of the region's unique color and no other coloring agent, such that the three or more predefined regions are respectively laced with coloring agents of at least three different colors in addition to a background color, wherein the coloring agent of each predefined region remains invisible until activated to become visible with the region's unique color;

extracting first and second data from a sortation instruction, wherein the first data and the second data jointly identify one shipping resource of the plurality of shipping resources;

selecting one region of the three or more predefined region based on the first data;

selecting a symbol or pattern based on the second data; and printing the selected symbol or pattern on the selected region of the sortation label by activating the coloring agent of the selected region.

13. A computer program product comprising:

one or more non-transitory computer-readable storage devices and program instructions stored on at least one of the one or more non-transitory storage devices, the program instructions executable by a processor, the program instructions comprising sets of instructions for:

receiving an inventory of a plurality of shipping resources;

receiving a blank sortation label comprising three or more predefined regions, wherein each predefined region is associated with a unique color and is laced with a coloring agent of the region's unique color and no other coloring agent, such that the three or more predefined regions are respectively laced with coloring agents of at least three different colors in addition to a background color, wherein the coloring agent of each predefined region remains invisible until activated to become visible with the region's unique color;

extracting first and second data from a sortation instruction, wherein the first data and the second data jointly identify one shipping resource of the plurality of shipping resources;

selecting one region of the three or more predefined region based on the first data;

selecting a symbol or pattern based on the second data; and printing the selected symbol or pattern on the selected region of the sortation label by activating the coloring agent of the selected region.

* * * * *